(12) United States Patent
Park et al.

(10) Patent No.: US 12,202,324 B2
(45) Date of Patent: Jan. 21, 2025

(54) BATTERY CASE FOR VEHICLE

(71) Applicants: Hyundai Motor Company, Seoul (KR); Kia Corporation, Seoul (KR)

(72) Inventors: Chan Hoon Park, Gyeonggi-Do (KR); Yong Hwan Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 513 days.

(21) Appl. No.: 17/521,923

(22) Filed: Nov. 9, 2021

(65) Prior Publication Data

US 2022/0063390 A1 Mar. 3, 2022

Related U.S. Application Data

(63) Continuation-in-part of application No. 17/028,911, filed on Sep. 22, 2020, now Pat. No. 11,912,120.

(30) Foreign Application Priority Data

Apr. 27, 2020 (KR) .................. 10-2020-0050812
Mar. 8, 2021 (KR) .................. 10-2021-0030371

(51) Int. Cl.
*H01M 50/209* (2021.01)
*B60K 1/04* (2019.01)
(Continued)

(52) U.S. Cl.
CPC .............. *B60K 1/04* (2013.01); *B60L 50/64* (2019.02); *B60L 50/66* (2019.02);
(Continued)

(58) Field of Classification Search
CPC ... B60K 1/04; B60K 2001/0438; B60L 50/64; B60L 50/66; B60Y 2306/01;
(Continued)

(56) References Cited

U.S. PATENT DOCUMENTS

2018/0029493 A1 2/2018 Kobayashi et al.
2018/0109328 A1 4/2018 Eberhard et al.
(Continued)

FOREIGN PATENT DOCUMENTS

KR 10-2014-0045778 A 4/2014
KR 10-2154361 9/2020

OTHER PUBLICATIONS

Non-Final Office Action issued Jul. 8, 2022 in U.S. Appl. No. 17/028,911.
(Continued)

*Primary Examiner* — Victoria H Lynch
(74) *Attorney, Agent, or Firm* — Fox Rothschild LLP (57) ABSTRACT

A battery case for a vehicle includes a lower panel supporting lower sides of a plurality of battery modules, the lower panel including a sidewall bent and extending upwards from the lower panel, a side member surrounding and supporting the sidewall of the lower panel to protect side surfaces of the battery modules, and a plurality of reinforcing members, each of which is disposed between neighboring ones of the battery modules such that two opposite ends of the reinforcing members are coupled to and supported by the sidewall.

9 Claims, 9 Drawing Sheets

(51) Int. Cl.
  *B60L 50/60* (2019.01)
  *B60L 50/64* (2019.01)
  *H01M 50/244* (2021.01)

(52) U.S. Cl.
  CPC ....... *H01M 50/209* (2021.01); *H01M 50/244* (2021.01); *H01M 2220/20* (2013.01)

(58) Field of Classification Search
  CPC ........... H01M 2220/20; H01M 50/209; H01M 50/242; H01M 50/244; H01M 50/249; Y02E 60/10; Y02T 10/70
  See application file for complete search history.

(56) References Cited

U.S. PATENT DOCUMENTS

| | | | |
|---|---|---|---|
| 2020/0127344 A1 | 4/2020 | Lim et al. | |
| 2020/0207221 A1* | 7/2020 | Matecki | B60L 50/64 |
| 2020/0287179 A1 | 9/2020 | Wang et al. | |
| 2020/0343498 A1 | 10/2020 | Schuessler et al. | |
| 2021/0221436 A1* | 7/2021 | Tsuyuzaki | B62D 25/025 |
| 2021/0402863 A1 | 12/2021 | Huang et al. | |

OTHER PUBLICATIONS

Non-Final Office Action issued on Apr. 30, 2024 in U.S. Appl. No. 17/521,929.

\* cited by examiner

BATTERY CASE FOR VEHICLE

CROSS-REFERENCE TO THE RELATED APPLICATION

This application is a continuation-in-part of U.S. Ser. No. 17/028,911 filed on Sep. 22, 2020, which claims under 35 U.S.C. § 119(a) the benefit of Korean Patent Application No. 10-2020-0050812 filed on Apr. 27, 2020 in the Korean Intellectual Property Office, and also claims under 35 U.S.C. § 119(a) the benefit of Korean Patent Application No. 10-2021-0030371 filed on Mar. 8, 2021 in the Korean Intellectual Property Office, the entire contents of which are incorporated herein by reference.

BACKGROUND

1. Technical Field

The present disclosure relates to a structure for installing a battery in a hybrid vehicle or an electric vehicle.

2. Description of the Related Art

The demand for eco-friendly vehicles, such as hybrid vehicles or electric vehicles, has recently increased. The increasing demand for eco-friendly vehicles has mandated an increase in energy capacity of batteries installed in vehicles.

Therefore, there is the need for technology for enabling installation of a battery having as large an energy capacity as possible in a limited space while securing sufficient durability and safety.

The information disclosed in this Background section is only for enhancement of understanding of the general background of the disclosure, and should not be taken as an acknowledgement or any form of suggestion that this information forms the related art already known to a person skilled in the art.

SUMMARY

It is an object of the present disclosure to provide a battery case for a vehicle, which secures as large a space as possible for installation of a battery in the vehicle so as to provide sufficient energy capacity required for an eco-friendly vehicle and secure safety and durability sufficient to withstand impacts in the event of a vehicle collision or the like, thereby ultimately improving the commercial value of the vehicle.

In accordance with the present disclosure, the above and other objects can be accomplished by the provision of a battery case for vehicles, including a lower panel supporting lower sides of a plurality of battery modules, the lower panel including a sidewall bent and extending upwards from the lower panel, a side member connected to and supporting the outer surface of the sidewall of the lower panel, the side member being configured to protect the side surfaces of the plurality of battery modules, and a plurality of reinforcing members disposed between the plurality of battery modules mounted in the battery case, the two opposite ends of each of the plurality of reinforcing members being coupled to and supported by the sidewall.

The sidewall of the lower panel may be bent and may extend upwards from the bottom surface of the lower panel at an angle $\alpha$ ranging from greater than 90° to less than 92° ($90°<\alpha<92°$).

The side member may have a protruding end integrally formed with the side member, and the protruding end may protrude outwards from at least a portion of the side member.

The side member may include a vertical closed cross-sectional portion forming a vertical wall that is coupled to the sidewall of the lower panel, a horizontal closed cross-sectional portion forming the protruding end at a lower side of the vertical closed cross-sectional portion, and an intermediate closed cross-sectional portion interconnecting the vertical closed cross-sectional portion and the horizontal closed cross-sectional portion.

The side member may include a first panel bent to form one closed loop defining the vertical closed cross-sectional portion and the horizontal closed cross-sectional portion and a second panel coupled at two opposite ends of the second panel to the first panel, the second panel defining the intermediate closed cross-sectional portion.

The side member may include a lower reinforcing panel extending from the protruding end to a lower side of the lower panel so as to be coupled to a lower surface of the lower panel.

The lower reinforcing panel may define a lower cross-sectional portion below the protruding end of the side member together with the protruding end and the lower panel.

The lower reinforcing panel may include a horizontal portion extending parallel to the lower panel and a slanted portion obliquely oriented with respect to the lower panel.

The lower reinforcing panel may include a gap-forming portion extending downwards from an end of the protruding end, a first horizontal portion extending from the gap-forming portion in a direction parallel to the lower panel, a slanted portion slanted downwards from the first horizontal portion, and a second horizontal portion extending from the slanted portion in a direction parallel to the lower panel so as to be coupled to the lower panel.

The angle $\beta$ formed between the slanted portion and each of the first horizontal portion and the second horizontal portion may be set within the range from greater than 1° to less than 3° ($1°<\beta<3°$).

Each of the plurality of reinforcing members may include a base member having a base closed cross-section therein and an additional member including two overlapping surfaces coupled to the base member, the additional member defining an additional closed cross-section therein together with the base member.

The base member may include two vertical surfaces defining the base closed cross-section. The two overlapping surfaces of the additional member may be respectively overlaid on and coupled to the two vertical surfaces of the base member. The base member may include toe portions formed at a lower surface of the base member, the toe portions respectively protruding laterally from the two vertical surfaces to a length corresponding to the thickness of each of the two overlapping surfaces of the additional member.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various exemplary embodiments will now be described more fully with reference to the accompanying drawings, in which only some exemplary embodiments are shown. Specific structural and functional details disclosed herein are merely representative for the purpose of describing exemplary embodiments. The present disclosure, however, may be embodied in many alternative forms, and should not be construed as being limited only to the exemplary embodiments set forth herein.

Accordingly, while exemplary embodiments of the disclosure are capable of being variously modified and taking alternative forms, embodiments thereof are shown by way of example in the drawings and will herein be described in detail. It should be understood, however, that there is no intent to limit the present disclosure to the particular exemplary embodiments disclosed. On the contrary, exemplary embodiments are to cover all modifications, equivalents, and alternatives falling within the scope of the disclosure.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, exemplary embodiments of the present disclosure will be described with reference to the accompanying drawings. In the drawings, the same reference numerals refer to the same components.

Referring to FIGS. 1 to 9, a battery case for a vehicle according to the present disclosure includes a lower panel 5, which supports lower sides of a plurality of battery modules 1 and has a sidewall 3 bent and extending upwards from the lower panel 5; a side member 7, which surrounds and supports the sidewall 3 of the lower panel 5 to protect the side surfaces of the battery modules 1; and a plurality of reinforcing members 9, each of which is disposed between neighboring ones of the battery modules 1 such that the two opposite ends thereof are coupled to and supported by the sidewall 3.

Figure 1:
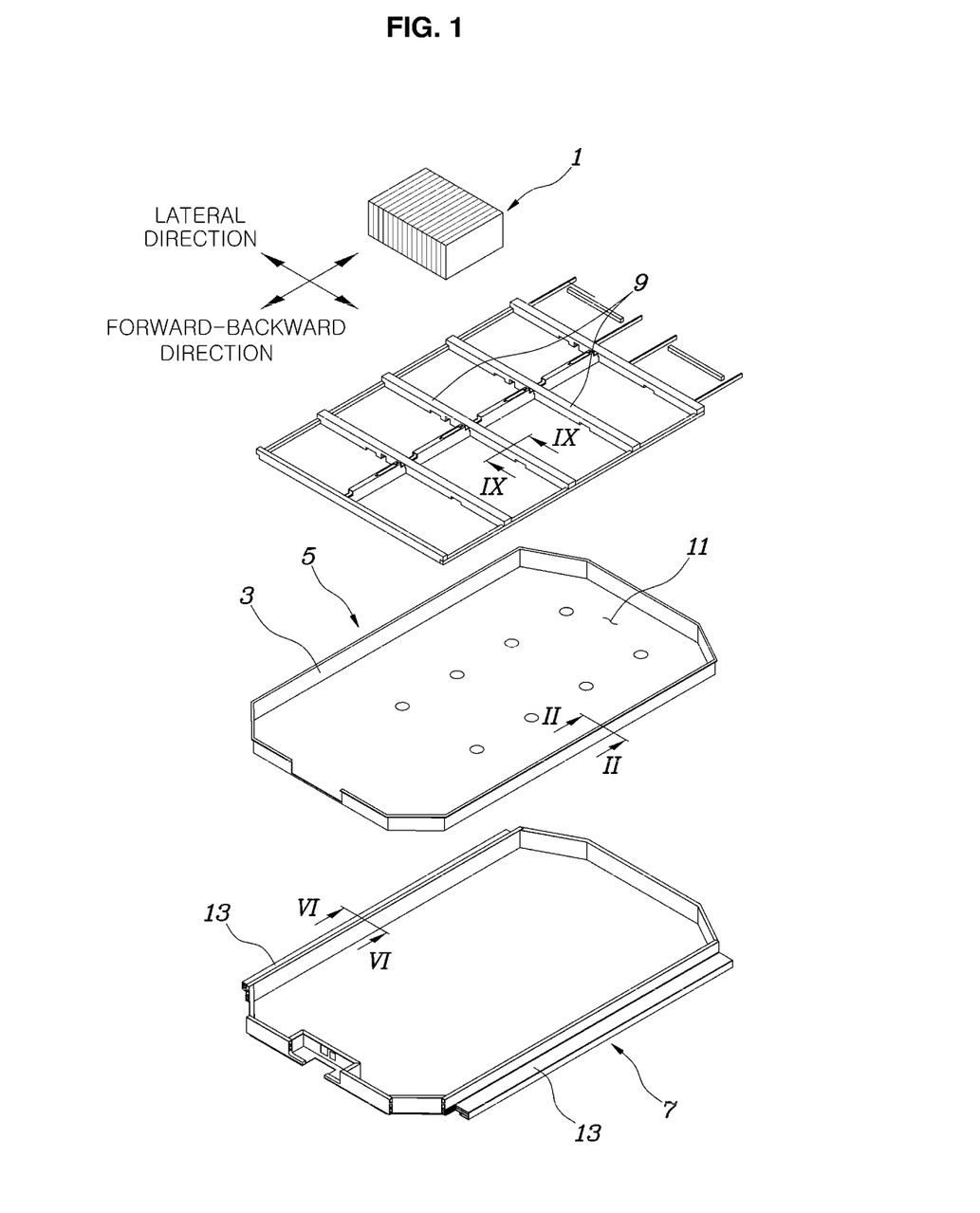
FIG. 1 is an exploded perspective view of a battery case for a vehicle according to the present disclosure.

That is, according to the battery case of the present disclosure, the lower sides of the plurality of battery modules 1 to be installed in the vehicle are supported by the lower panel 5, the side surfaces of the battery modules 1 are supported by the side member 7, and the plurality of reinforcing members 9 is mounted between the battery modules 1, whereby it is possible to secure sufficient space for installation of the battery modules 1 and also to secure sufficient strength of the battery case.

In addition, a separate cover (not shown) may be coupled to the upper part of the battery case before the battery case is installed in the vehicle.

Figure 2:
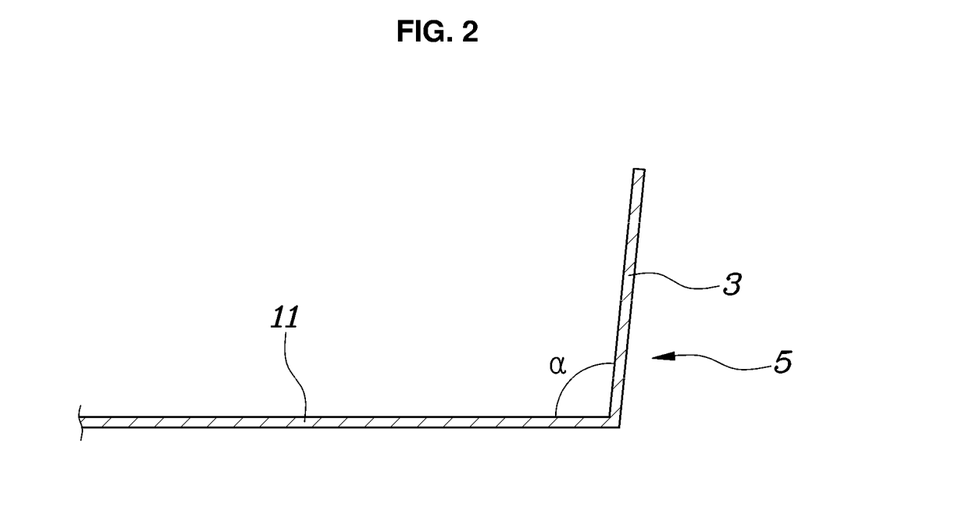
FIG. 2 is a cross-sectional view taken along line II-II in FIG. 1.

As shown in FIGS. 1 and 2, the sidewall 3 of the lower panel 5 is bent and extends upwards from an edge of a bottom surface 11 of the lower panel 5. Preferably, the sidewall 3 is bent and extends upwards from the bottom surface 11 at an angle α ranging from greater than 90° to less than 92°($90° < α < 92°$).

Figure 3:
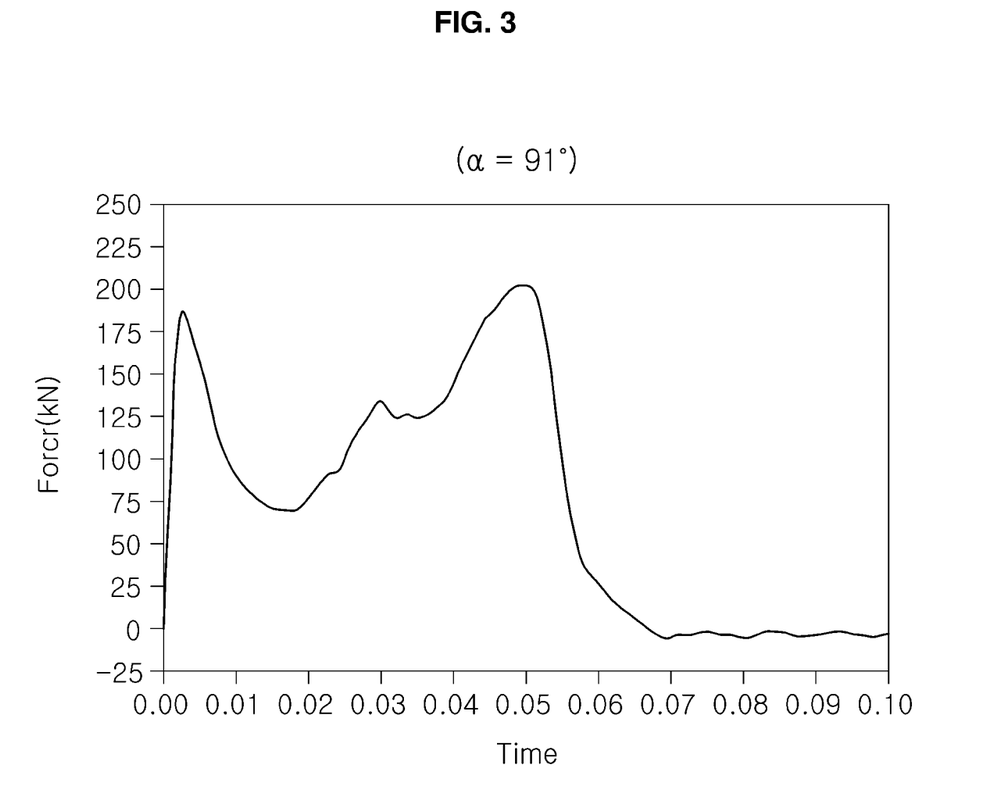
FIGS. 3 to 5 are graphs showing the results of strength tests according to the bending angle of a sidewall of a lower panel.
Figure 4:
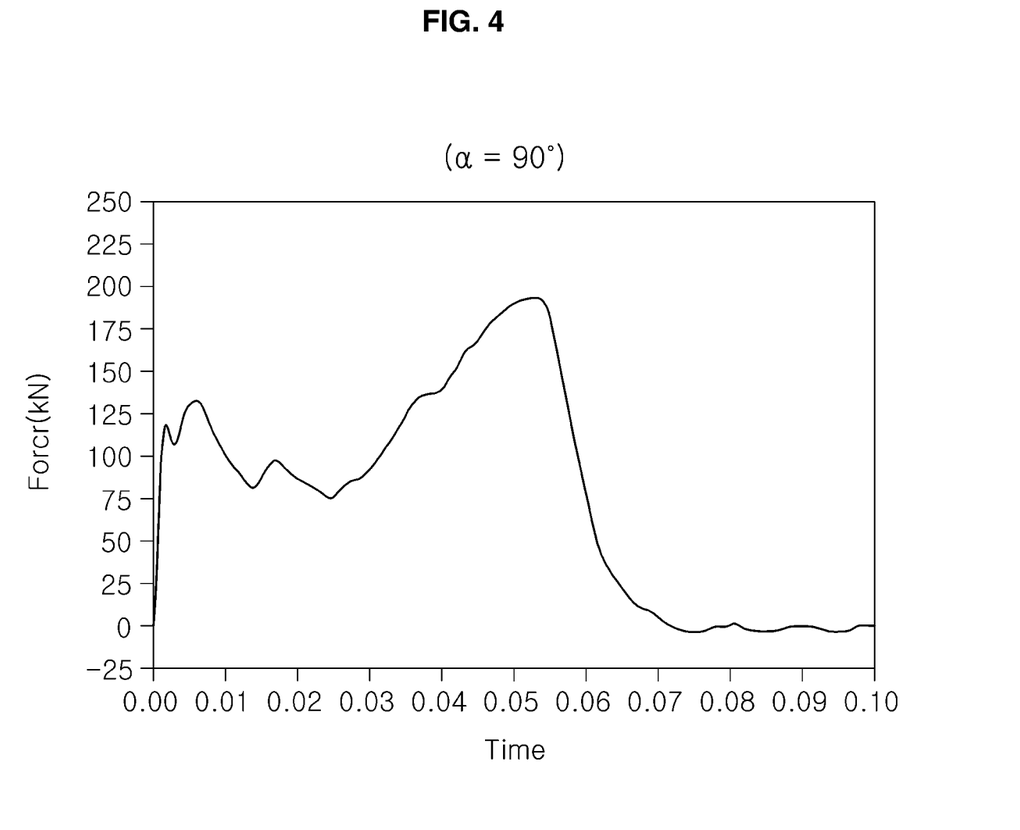
Figure 5:
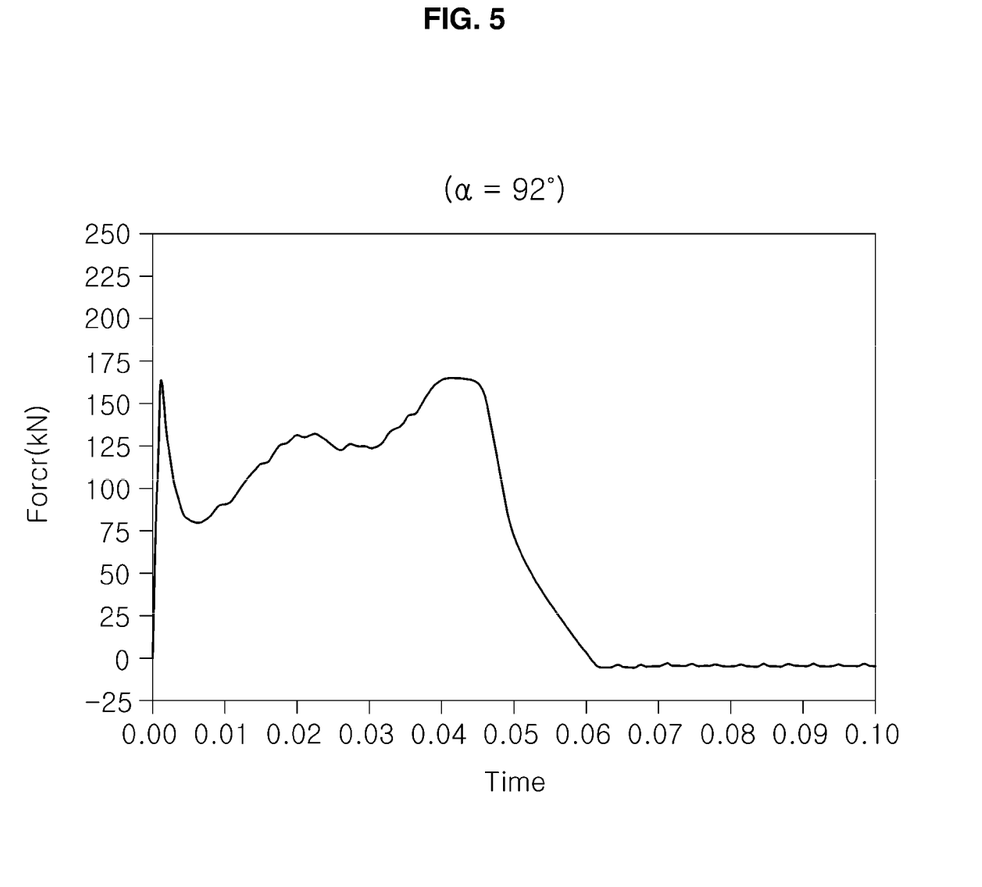

The effects achievable through this configuration can be made clear from the test results of strength of the lower panel 5 shown in FIGS. 3 to 5.

FIGS. 3 to 5 show the results of tests performed in a manner such that force is applied to the lower panel 5 in a lateral direction in a state in which front and rear ends of the lower panel 5 are fixedly supported. It can be seen from FIGS. 3-5 that a magnitude of reaction force of the lower panel 5 has a primary peak value and a secondary peak value, i.e. two peak values, in a span of time from a time of initial application of force.

Among the primary peak value and the secondary peak value, the primary peak value, which indicates that there is no substantial deformation of the lower panel 5, is more important. The case of FIG. 3 has a primary peak value of 186.95 kN, the case of FIG. 4 has a primary peak value of 131.36 kN, and the case of FIG. 5 has a primary peak value of 161.57 kN. It can be seen that the case of FIG. 3 has the largest primary peak value and is therefore the most preferred.

The angle α in the case of FIG. 3 is 91°, the angle α in the case of FIG. 4 is 90°, and the angle α in the case of FIG. 5 is 92°. As a result, it is preferable that the angle α at which the sidewall 3 is bent and extends upwards from the bottom surface 11 of the lower panel 5 be set within the range from greater than 90° to less than 92°($90° < α <$) 92°.

Further, the lower panel 5 may be formed as an aluminum plate having a thickness of 2 mm.

The side member 7 has protruding ends 13 integrally formed with the side member 7. Each of the protruding ends 13 protrudes outwards from at least a portion of the side member 7.

In the present embodiment, the protruding ends 13 are formed at the two opposite lateral portions of the side member 7, as shown in FIG. 1. The battery case is installed in the vehicle body such that the protruding ends 13 are oriented in the lateral direction of the vehicle body, whereby it is possible to effectively prevent external impacts from being transferred to the battery modules 1 in the battery case in the event of an accident such as a side collision of the vehicle.

Figure 6:
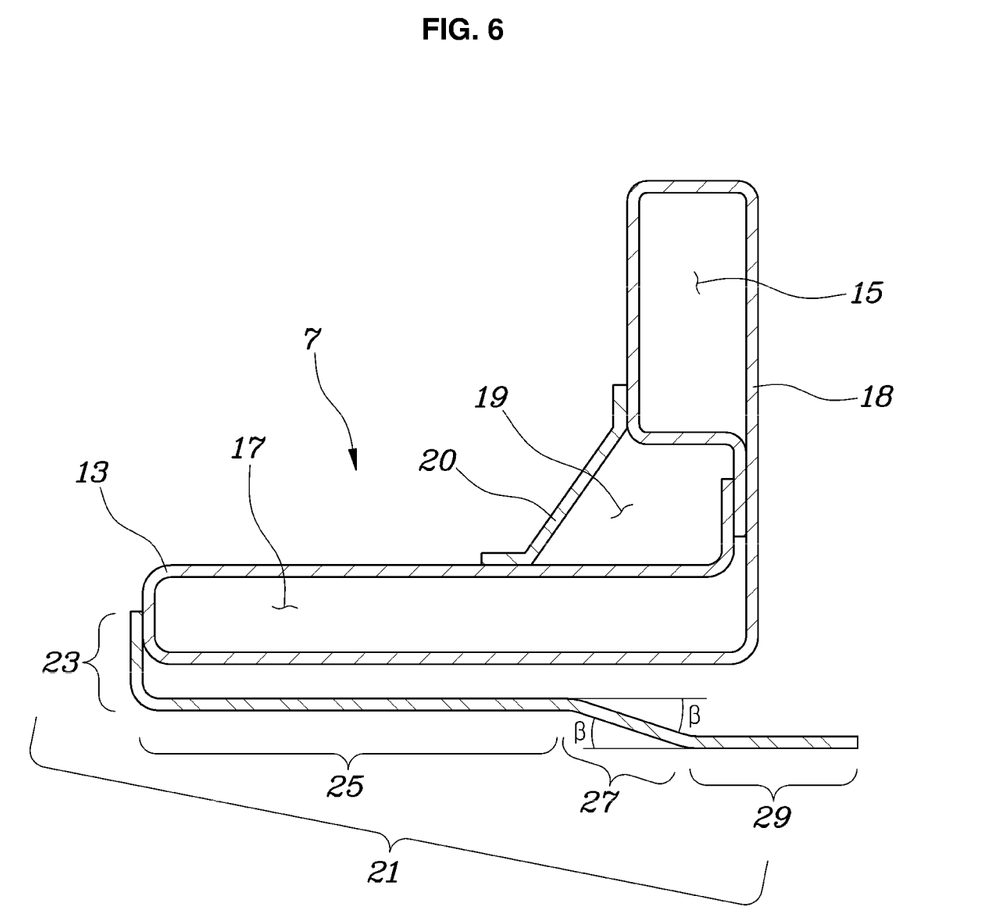
FIG. 6 is a cross-sectional view taken along line VI-VI in FIG. 1.
Figure 7:
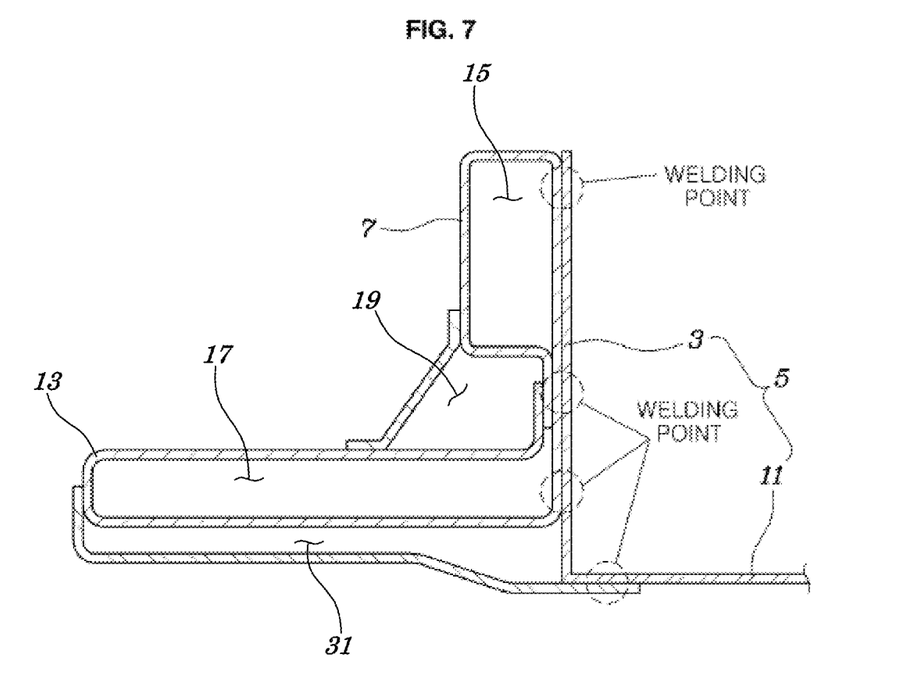
FIG. 7 is a cross-sectional view showing the state in which the side member shown in FIG. 6 is coupled to the lower panel.

As shown in the cross-sectional views of FIGS. 6 and 7, a portion of the side member 7 at which each of the protruding ends 13 is formed includes a vertical closed cross-sectional portion 15, which forms a vertical wall that is coupled to the sidewall 3 of the lower panel 5, a horizontal closed cross-sectional portion 17, which forms each of the protruding ends 13 at a lower side of the vertical closed cross-sectional portion 15, and an intermediate closed cross-sectional portion 19, which interconnects the vertical closed cross-sectional portion 15 and the horizontal closed cross-sectional portion 17.

Accordingly, the vertical closed cross-sectional portion 15 secures a sufficiently large surface for coupling to the lower panel 5 and protects the side portions of the battery modules 1 mounted in the battery case, the protruding end 13 formed by the horizontal closed cross-sectional portion 17 increases the strength of the battery case, thereby maximizing the extent of protection of the battery modules 1, and the intermediate closed cross-sectional portion 19 forms a firm multi-closed cross-sectional structure together with the vertical closed cross-sectional portion 15 and the horizontal closed cross-sectional portion 17, thereby securing sufficient strength of the battery case.

According to the present embodiment, the side member 7 includes a first panel 18, which is bent to form one closed loop defining the vertical closed cross-sectional portion 15 and the horizontal closed cross-sectional portion 17, and a second panel 20, which is coupled at the two opposite ends thereof to the first panel 18 so as to define the intermediate closed cross-sectional portion 19.

Specifically, as shown in FIG. 6, the first panel 18 is bent to define the two sections, and the second panel 20 is welded to the first panel 18, thereby forming the side member 7. Therefore, the side member 7 of the embodiment has advantages in which the number of components is small, a manufacturing process is simplified, and a plurality of closed cross-sectional portions is formed, thereby securing sufficient strength of the battery case.

Further, the vertical closed cross-sectional portion 15 and the sidewall 3 of the lower panel 5 may be coupled to each other by welding the same at a plurality of welding points, as shown in FIG. 7.

In addition, according to the present embodiment, the side member 7 further includes a lower reinforcing panel 21, which extends from the protruding end 13 to a lower side of the lower panel 5 and is coupled to a lower surface of the lower panel 5.

The lower reinforcing panel 21 defines a lower cross-sectional portion 31 below the protruding end 13 of the side member 7 together with the protruding end 13 and the lower panel 5.

That is, in addition to the multi-closed cross-sectional structure of the side member 7, the lower reinforcing panel 21 forms a more complex multi-closed cross-sectional structure together with the lower panel 5, thereby more effectively protecting the battery modules 1 mounted in the battery case from impacts transferred thereto via the lateral portion of the vehicle.

The lower reinforcing panel 21, which extends to the lower panel 5, may include a horizontal portion, which extends parallel to the lower panel 5, and a slanted portion, which is obliquely oriented with respect to the lower panel 5.

According to the present embodiment, the lower reinforcing panel 21 includes a gap-forming portion 23, which extends downwards from an end of the protruding end 13, a first horizontal portion 25, which extends from the gap-forming portion 23 in a direction parallel to the lower panel 5, a slanted portion 27, which is slanted downwards from the first horizontal portion 25, and a second horizontal portion 29, which extends from the slanted portion 27 in a direction parallel to the lower panel 5 and is coupled to the lower panel 5.

That is, the lower reinforcing panel 21 is configured such that the slanted portion 27 is formed between the first horizontal portion 25 and the second horizontal portion 29, which are spaced downwards apart from the protruding end 13, thereby defining the lower closed cross-sectional portion 31 between the protruding end 13 and the lower panel 5.

It is preferable that the angle β formed between the slanted portion 27 and each of the first horizontal portion 25 and the second horizontal portion 29 be set within the range from greater than 1° to less than 3°($1° < β < 3°$).

Figure 8:
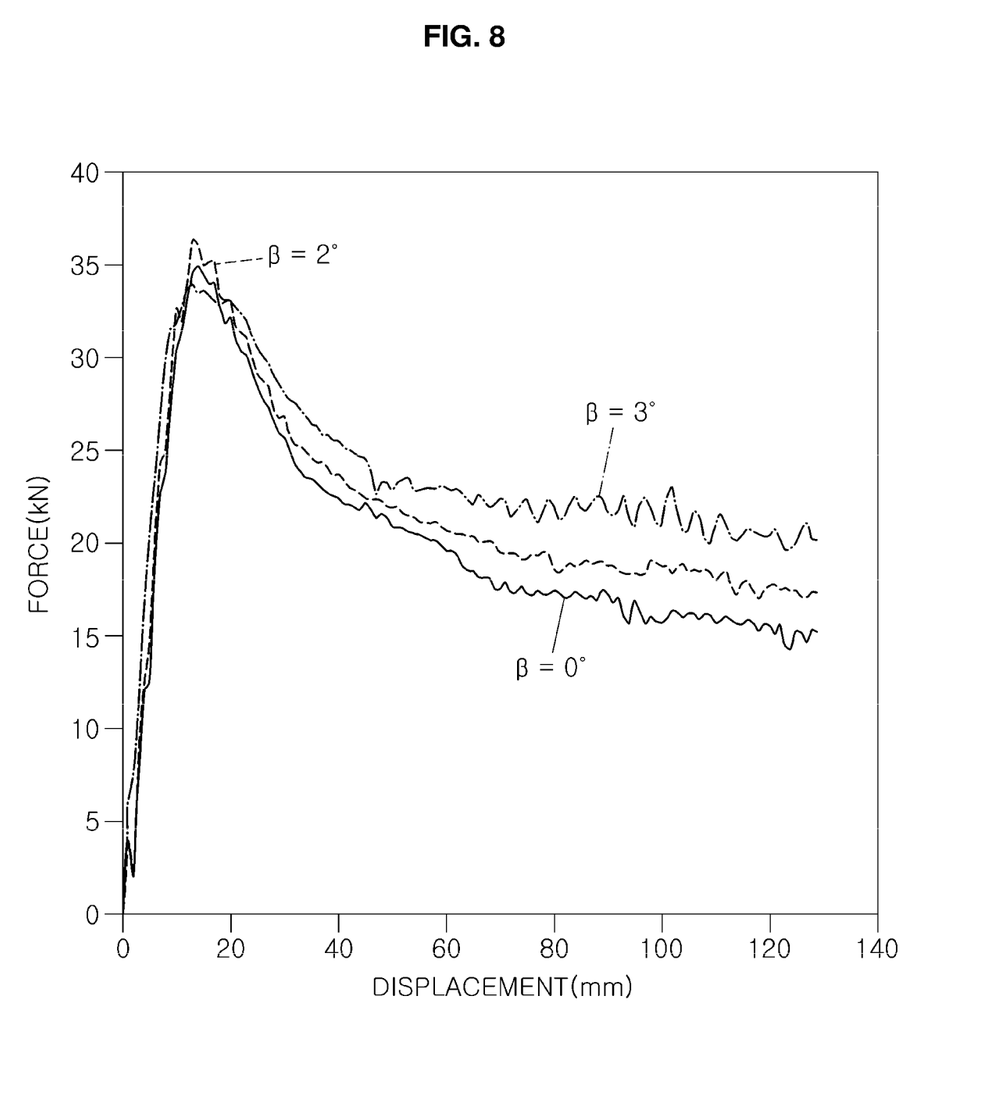
FIG. 8 is a graph showing the results of strength tests according to the slant angle of a slanted portion of a lower reinforcing panel.

FIG. 8 shows the results of tests performed in a manner in which force is applied to the side member 7 having the cross-sectional structure shown in FIG. 6 in a lateral direction in the state in which the two ends of the side member 7 are fixedly supported. It can be seen that the case in which the angle β is 2° endures a force of 36.3 kN, which is greater than the maximum force that can be endured in the case in which the angle β is 0° and in the case in which the angle β is 3°. Accordingly, it is preferable that the angle β formed between the slanted portion 27 and each of the first horizontal portion 25 and the second horizontal portion 29 be set within the range from greater than 1° to less than 3°(1°<β<3°).

Further, the cross-sectional structure shown in FIG. 6 may be formed by roll-forming an aluminum plate having a thickness of 2.5 mm.

Figure 9:
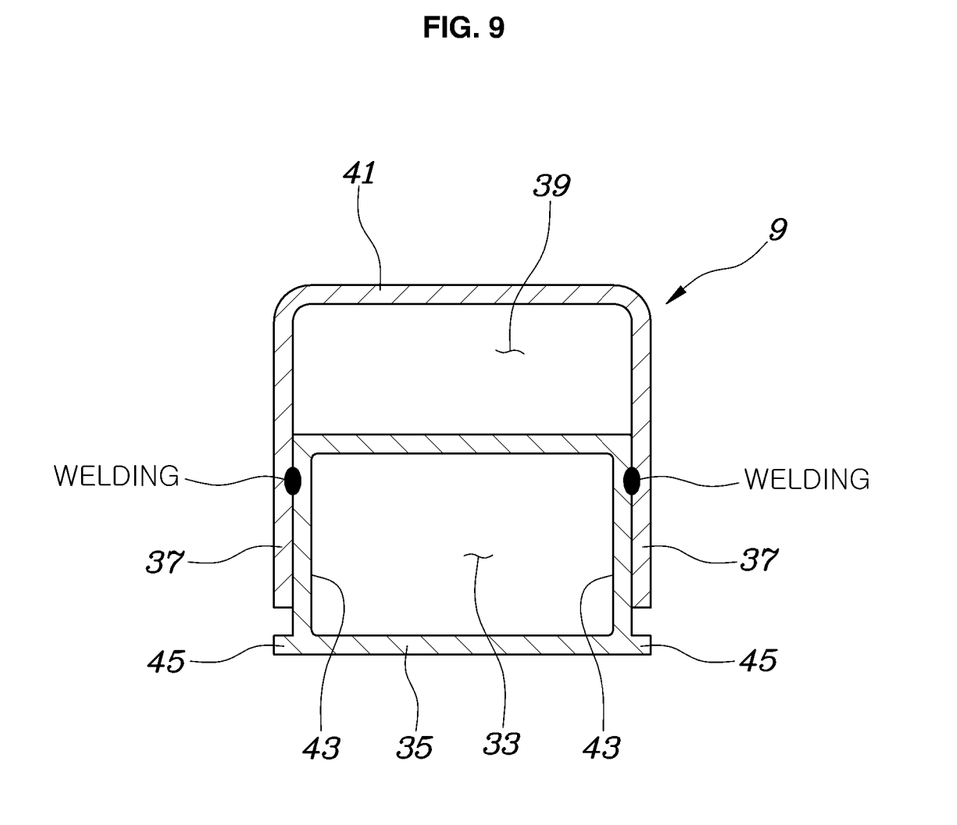
FIG. 9 is a cross-sectional view taken along line IX-IX in FIG. 1.

As shown in FIG. 9, the reinforcing member 9 includes a base member 35, which has a base closed cross-section 33 therein, and an additional member 41, which has two overlapping surfaces 37 coupled to the base member 35 and defines an additional closed cross-section 39 therein together with the base member 35.

Since the base member 35 has the base closed cross-section 33 therein, the base member 35 is preferably formed through aluminum extrusion, and the additional member 41 is preferably formed through aluminum roll forming, and is preferably welded to the base member 35.

The base member 35 includes two vertical surfaces 43 defining the base closed cross-section 33. The overlapping surfaces 37 of the additional member 41 are respectively overlaid on and coupled to the two vertical surfaces 43 of the base member 35. A lower surface of the base member 35 includes toe portions 45, which respectively protrude laterally from the two vertical surfaces 43 to a length corresponding to the thickness of each of the overlapping surfaces 37 of the additional member 41.

Specifically, the overlapping surfaces 37 and the vertical surfaces 43 are welded to each other, thereby securing firm coupling between the base member 35 and the additional member 41. The toe portions 45 serve to greatly increase a section modulus while minimizing an increase in the weight of the reinforcing member 9. Consequently, the reinforcing member 9 makes it possible to secure high strength of the battery case.

As is apparent from the above description, the battery case for a vehicle according to the present disclosure secures as large a space as possible for installation of a battery in a vehicle so as to provide sufficient energy capacity required for an eco-friendly vehicle, and secures safety and durability sufficient to withstand impacts in the event of a vehicle collision or the like, thereby ultimately improving the commercial value of the vehicle.

Although exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A battery case for a vehicle, comprising:
   a lower panel supporting lower sides of a plurality of battery modules, the lower panel comprising a sidewall bent and extending upwards from the lower panel;
   a side member connected to and supporting an outer surface of the sidewall of the lower panel, the side member being configured to protect side surfaces of the plurality of battery modules; and
   a plurality of reinforcing members disposed between the plurality of battery modules mounted in the battery case, opposite ends of each of the plurality of reinforcing members being coupled to and supported by the sidewall;
   wherein the side member comprises:
      a protruding end integrally formed with the side member and protruding outwards from at least a portion of the side member; and
      a lower reinforcing panel extending from the protruding end to a lower side of the lower panel so as to be coupled to a lower surface of the lower panel,
      wherein the lower reinforcing panel comprises:
         a gap-forming portion extending downwards from an end of the protruding end;
         a first horizontal portion extending from the gap-forming portion in a direction parallel to the lower panel;
         a slanted portion slanted downwards from the first horizontal portion; and
         a second horizontal portion extending from the slanted portion in a direction parallel to the lower panel so as to be coupled to the lower panel.

2. The battery case of claim 1, wherein the sidewall of the lower panel is bent and extends upwards from a bottom surface of the lower panel at an angle (α) ranging from greater than 90° to less than 92°(90°<α<92°).

3. The battery case of claim 1, wherein the side member comprises:
   a vertical closed cross-sectional portion forming a vertical wall that is coupled to the sidewall of the lower panel;
   a horizontal closed cross-sectional portion forming the protruding end at a lower side of the vertical closed cross-sectional portion; and
   an intermediate closed cross-sectional portion interconnecting the vertical closed cross-sectional portion and the horizontal closed cross-sectional portion.

4. The battery case of claim 3, wherein the side member comprises:
   a first panel bent to form one closed loop defining the vertical closed cross-sectional portion and the horizontal closed cross-sectional portion; and
   a second panel coupled at opposite ends of the second panel to the first panel, the second panel defining the intermediate closed cross-sectional portion.

5. The battery case of claim 1, wherein the lower reinforcing panel comprises:
   a horizontal portion extending parallel to the lower panel; and
   a slanted portion obliquely oriented with respect to the lower panel.

6. The battery case of claim 1, wherein an angle (β) formed between the slanted portion and each of the first horizontal portion and the second horizontal portion is set within a range from greater than 1° to less than 3°(1°<β<3°).

7. The battery case of claim 1, wherein each of the plurality of reinforcing members comprises:
   a base member having a base closed cross-section therein; and
   an additional member comprising two overlapping surfaces coupled to the base member, the additional member defining an additional closed cross-section therein together with the base member.

8. The battery case of claim 7, wherein the base member comprises two vertical surfaces defining the base closed cross-section, wherein the two overlapping surfaces of the additional member are respectively overlaid on and coupled to the two vertical surfaces of the base member, and wherein the base member comprises toe portions formed at a lower surface of the base member, the toe portions respectively protruding laterally from the two vertical surfaces to a length corresponding to a thickness of each of the two overlapping surfaces of the additional member.

9. A battery case for a vehicle, comprising:

a lower panel supporting lower sides of a plurality of battery modules, the lower panel comprising a sidewall bent and extending upwards from the lower panel;

a side member connected to and supporting an outer surface of the sidewall of the lower panel, the side member being configured to protect side surfaces of the plurality of battery modules; and a plurality of reinforcing members disposed between the plurality of battery modules mounted in the battery case, opposite ends of each of the plurality of reinforcing members being coupled to and supported by the sidewall;

wherein the side member comprises:

a protruding end integrally formed with the side member and protruding outwards from at least a portion of the side member;

a vertical closed cross-sectional portion forming a vertical wall that is coupled to the sidewall of the lower panel;

a horizontal closed cross-sectional portion forming the protruding end at a lower side of the vertical closed cross-sectional portion;

an intermediate closed cross-sectional portion interconnecting the vertical closed cross-sectional portion and the horizontal closed cross-sectional portion; and a lower reinforcing panel extending from the horizontal closed cross-sectional portion to a lower side of the lower panel so as to be coupled to a lower surface of the lower panel;

wherein the lower reinforcing panel defines a lower cross-sectional portion below the horizontal closed cross-sectional portion of the side member together with the horizontal closed cross-sectional portion and the lower panel.

* * * * *